(12) United States Patent
Arataki et al.

(10) Patent No.: US 7,895,476 B2
(45) Date of Patent: Feb. 22, 2011

(54) DATA RELAY DEVICE, STORAGE DEVICE AND DATA-RELAY METHOD

(75) Inventors: Nina Arataki, Kawasaki (JP); Sadayuki Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 653 days.

(21) Appl. No.: 11/902,646

(22) Filed: Sep. 24, 2007

(65) Prior Publication Data

US 2008/0184080 A1    Jul. 31, 2008

(30) Foreign Application Priority Data

Dec. 12, 2006  (JP) ............................. 2006-334483

(51) Int. Cl.
    *G06F 11/00* (2006.01)
(52) U.S. Cl. ........................ 714/49; 714/34; 710/262; 710/268
(58) Field of Classification Search .............. 714/34, 714/49; 710/262, 268
See application file for complete search history.

(56) References Cited

U.S. PATENT DOCUMENTS

| | | | | |
|---|---|---|---|---|
| 4,482,954 A | * | 11/1984 | Vrielink et al. | ............. 710/268 |
| 5,107,489 A | * | 4/1992 | Brown et al. | ................. 370/360 |
| 5,491,816 A | | 2/1996 | Matoba et al. | |
| 5,689,726 A | * | 11/1997 | Lin | ............................. 710/10 |
| 5,689,728 A | | 11/1997 | Sugimoto et al. | |
| 5,724,029 A | * | 3/1998 | Takao et al. | .................. 370/439 |
| 5,826,003 A | | 10/1998 | Matoba et al. | |
| 5,898,828 A | * | 4/1999 | Pignolet et al. | ................. 714/6 |
| 6,021,456 A | * | 2/2000 | Herdeg et al. | ............... 710/260 |
| 6,324,655 B1 | | 11/2001 | Matoba et al. | |
| 6,606,676 B1 | * | 8/2003 | Deshpande et al. | ......... 710/262 |
| 7,552,359 B2 | * | 6/2009 | Takemori | ..................... 714/11 |
| 2006/0083076 A1 | | 4/2006 | Sakai et al. | |
| 2006/0236052 A1 | | 10/2006 | Minowa | |
| 2008/0031279 A1 | * | 2/2008 | Hatakeyama et al. | ....... 370/476 |

FOREIGN PATENT DOCUMENTS

| | | |
|---|---|---|
| JP | 61-245253 | 10/1986 |
| JP | 2-62623 | 3/1990 |
| JP | 5-265873 | 10/1993 |
| JP | 5-334018 | 12/1993 |
| JP | 07-044470 | 2/1995 |
| JP | 07-444470 | 2/1995 |
| JP | 7-168694 | 7/1995 |
| JP | 7-281965 | 10/1995 |
| JP | 2567922 | 10/1996 |
| JP | 11-134261 | 5/1999 |
| JP | 2000-003331 | 1/2000 |

(Continued)

OTHER PUBLICATIONS

Japanese Office Action issued Feb. 3, 2009 in corresponding Japanese Office Action 2006-334483.

*Primary Examiner*—Robert Beausoleil
*Assistant Examiner*—Charles Ehne
(74) *Attorney, Agent, or Firm*—Fujitsu Patent Center (57) ABSTRACT

In a data relay device, it is judged whether a destination address of data received from an adapter matches with an address specified for an interruption process. Only data that is judged appropriate is sent to a controller.

12 Claims, 8 Drawing Sheets

FOREIGN PATENT DOCUMENTS

| | | |
|---|---|---|
| JP | 2002-123372 | 4/2002 |
| JP | 2005-266871 | 9/2005 |
| JP | 2005-301862 | 10/2005 |
| JP | 2006-113881 | 4/2006 |
| JP | 2006-285519 | 10/2006 |
| JP | 2006-285778 | 10/2006 |

* cited by examiner

DATA RELAY DEVICE, STORAGE DEVICE AND DATA-RELAY METHOD

BACKGROUND OF THE INVENTION

1. Field of the Invention

The present invention relates to a technology for relaying data from adapters to a controller that includes a processor.

2. Description of the Related Art

In recent years, improved processing ability of computers has resulted in ever increasing volume of data used by the computers. Technologies related to storage of considerable volume of data are being examined. Specifically, for example, one of the technologies called Redundant Array of Independent Disks (RAID) involves combining a plurality of hard disk drives to realize a speedy, highly reliable, and high capacity disk system.

In a disk system such as RAID, a disk array device, which includes a plurality of disks for storing data, receives commands from a host computer and performs data read and data write operation. In this process, the data that is exchanged between the host computer and the disks is cached in a cache memory of the disk array device. Generally, subsequent processes become speedy when the data is read from the cache memory instead of reading the data from the host computer or the disks.

For example, Japanese Patent No. 2567922 discloses a conventional technology in which a plurality of channels is arranged in between a host computer and a disk array device for efficient transfer of data. A plurality of channel adapters in the disk array device is connected to the host computer. In the conventional technology, a plurality of data transfer routes is formed, which includes the respective channel adapters, between a cache memory of the disk array device and the host computer.

Figure 8A:
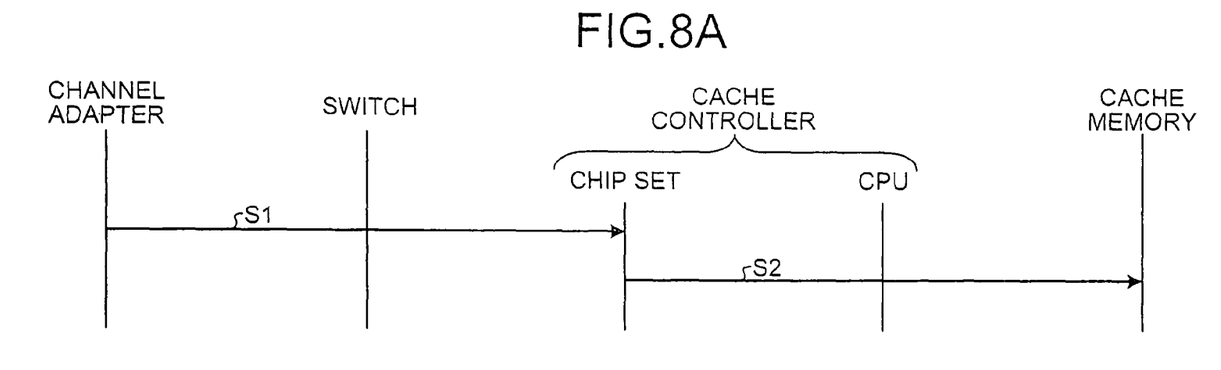
FIGS. 8A and 8B are sequence diagrams for explaining data-write operation by a typical channel adapter.

When data from the host computer is written to a disk in the disk array device, a switch becomes necessary to transform data transfer routes into one route and to relay the data to the cache memory. The data from the channel adapters and the switch is written to the cache memory via a cache controller that includes a chip set and a central processing unit (CPU), which is shown in FIG. 8A. As shown in FIG. 8A, write-data input from the host computer to the channel adapters is transferred to the chip set in the cache controller via the switch (step S1). A destination address of the write-data is referred to by the chip set, and the write-data is written onto a relevant address in the cache memory (step S2).

In the specification of a peripheral component interconnect (PCI) bus, it is defined that in the ordinary process of the cache controller, an interruption process is executed by the CPU in the cache controller according to an interrupt method called message signaled interrupt (MSI). When a particular address is specified as a destination address of the write-data, the chip set notifies the CPU of occurrence of interruption such that the CPU executes the interruption process according to MSI.

Figure 8B:
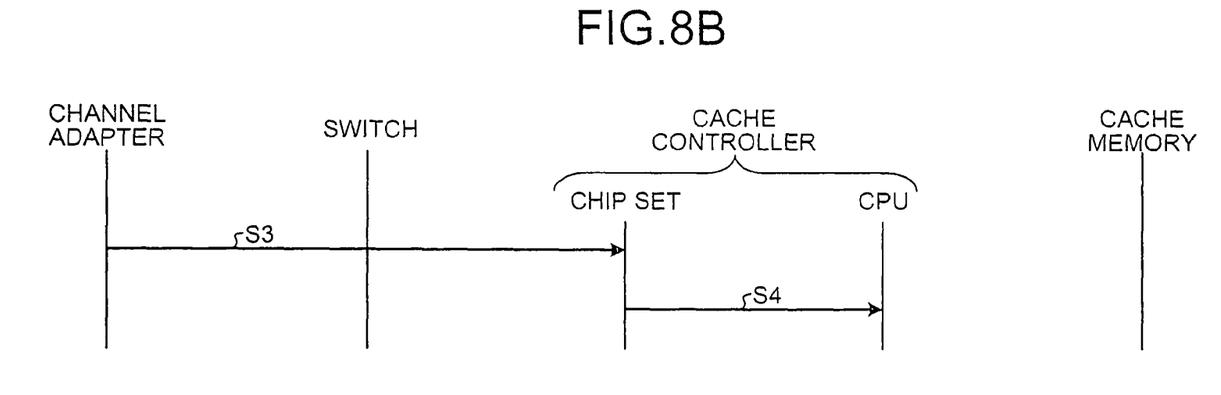

That is, as shown in FIG. 8B, the write-data that requests interruption is transferred to the chip set in the cache controller via the channel adapter and the switch (step S3). The chip set detects if the destination address of the write-data is an MSI address, and prompts the CPU to execute the interruption process (step S4).

When the interruption process is executed according to MSI, a process defined in advance as the interruption process is executed. However, if an error occurs in a write-data that has requested the interruption, or if an error occurs in the destination address of the write-data, a process not defined as the interruption process may be requested.

At such time, the CPU that is requested to execute undefined interruption process judges that an error has occurred and executes an error recovery process. If it is judged that a fatal error has occurred, all processes are suspended. If the CPU in the cache controller suspends the processes, reading or writing of data from or to the disk array device becomes impossible, resulting in considerable loss.

Even if the CPU performs the error recovery process without suspending the processes, the CPU is burdened with the extra processing load for determining a cause of the error. In other words, if there is a request for undefined interruption process, the CPU needs to find out the device from which the error has originated. That is, the CPU needs to check the condition of the channel adapters, the switch, and the chip set in the cache controller, and any other devices that may have caused the error. Thus, the CPU is overburdened and data transfer between the host computer and the cache memory is affected.

SUMMARY OF THE INVENTION

It is an object of the present invention to at least partially solve the problems in the conventional technology.

According to an aspect of the present invention, a data relay device that relays data from a plurality of adapters to a controller including a processor includes a monitoring unit that monitors a destination address of data received from an adapter among the adapters; a judging unit that judges whether the data is appropriate when the destination address matches with an address that corresponds to an interruption process to be performed by the processor; and a transmitting unit that transmits the data to the controller only when the data is judged appropriate by the judging unit.

According to another aspect of the present invention, a storage device that stores data transmitted from a host computer by writing the data to a storage medium includes a channel adapter that receives the data from the host computer; a switch that relays the data received by the channel adapter; and a cache controller that includes a processor and controls writing of the data to a cache memory. The switch includes a monitoring unit that monitors destination address of the data received by the channel adapter; a judging unit that judges whether the data is appropriate when the destination address matches with an address that corresponds to an interruption process to be performed by the processor; and a transmitting unit that transmits the data to the cache controller only when the data is judged appropriate by the judging unit.

According to still another aspect of the present invention, a method of relaying data from a plurality of adapters to a controller including a processor includes monitoring a destination address of data received from an adapter among the adapters; judging whether the data is appropriate when the destination address matches with an address that corresponds to an interruption process to be performed by the processor; and transmitting the data to the controller only when the data is judged appropriate at the judging.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
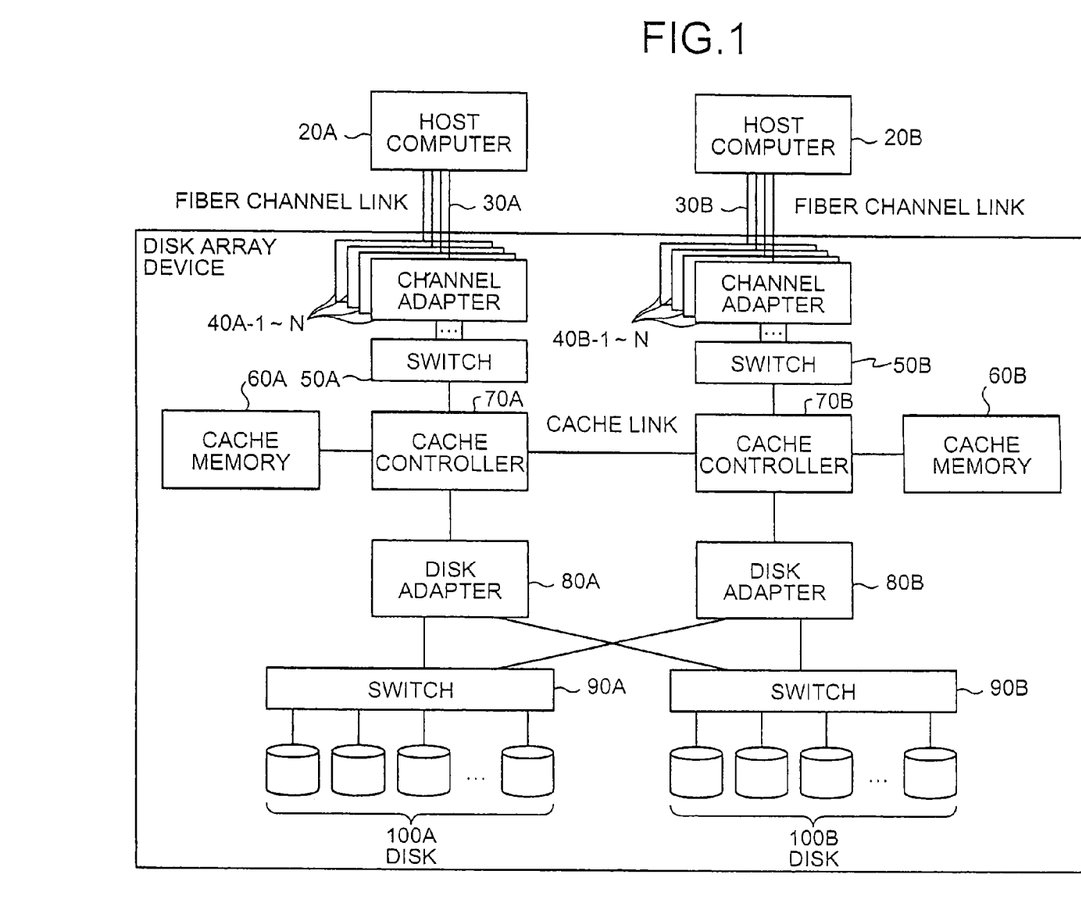
FIG. 1 is a block diagram of a disk array device according to an embodiment of the present invention.

FIG. 1 is a block diagram of a disk array device 10 according to an embodiment of the present invention. As shown in FIG. 1, the disk array device 10 is an example of a computer system that uses direct memory access (DMA), and is connected to host computers 20A and 20B via fiber channel links 30A and 30B. The disk array device 10 has a duplex structure to ensure high degree of reliability and each component is in double systems (components in the respective systems are distinguished by reference letters A and B). The components of each system have the same function. Therefore, explanation given below is only about one system, i.e., "A" system.

The disk array device 10 includes a plurality of channel adapters 40A-1 to 40A-N (N is a natural number equal to or larger than 2), a switch 50A, a cache memory 60A, a cache controller 70A, a disk adapter 80A, a switch 90A, and a disk 100A.

The channel adapters 40A-1 to 40A-N are each connected to a host computer 20A, and function as a communication interface to send data to and receive data from the host computer 20A. Each of the channel adapters 40A-1 to 40A-N includes a DMA chip that manages data transfer by DMA. The channel adapters 40A-1 to 40A-N have the same functions. If an error occurs in the channel adapter 40A-M (M is a natural number equal to or larger than 1, and equal to or less than N), the channel adapters 40A-1 to 40A-N are forcibly or voluntarily shut down by the cache controller 70A.

The switch 50A relays data transfer between the channel adapters 40A-1 to 40A-N and the cache memory 60A. At such time, the switch 50A multiplexes data input from the channel adapters 40A-1 to 40A-N into one output for transferring the data to the cache memory 60A. If a destination address of the data input from one of the channel adapters 40A-1 to 40A-N is a predetermined address, the switch 50A checks whether the data is appropriate. If an inappropriate data is detected, a message of occurrence of an error is sent to the one of the channel adapters 40A-1 to 40A-N, and to the cache controller 70A. Data check performed by the switch 50A will be described in detail later.

The cache memory 60A temporarily stores therein data that is to be written from the host computer 20A to a plurality of disks 100A and data that is to be read from the disks 100A by the host computer 20A.

The cache controller 70A manages and controls writing and reading of data to and from the cache memory 60A. When the cache controller 70A receives an error message from the switch 50A, the cache controller 70A reads error history retained in the switch 50A and identifies the one of the channel adapters 40A-1 to 40A-N that has caused the error. When the one of the channel adapters 40A-1 to 40A-N does not shut down voluntarily, it is shut down forcibly. The cache controller 70A is connected to a cache controller 70B of another system by a cache link, so that data to be written to cache memories 60A and 60B can be shared.

The disk adapter 80A functions as a communication interface for sending and receiving data to and from the disks 100A. In other words, the disk adapter 80A sends data read from the cache memory 60A to the disks 100A and receives data that is to be written in the cache memory 60A from the disks 100A.

The switch 90A is connected to the disks 100A, and switches connection between each of the disks 100A and the disk adapter 80A. The disks 100A are formed of, for example, a plurality of hard disk drives, and store therein data that is to be transferred.

Figure 2:
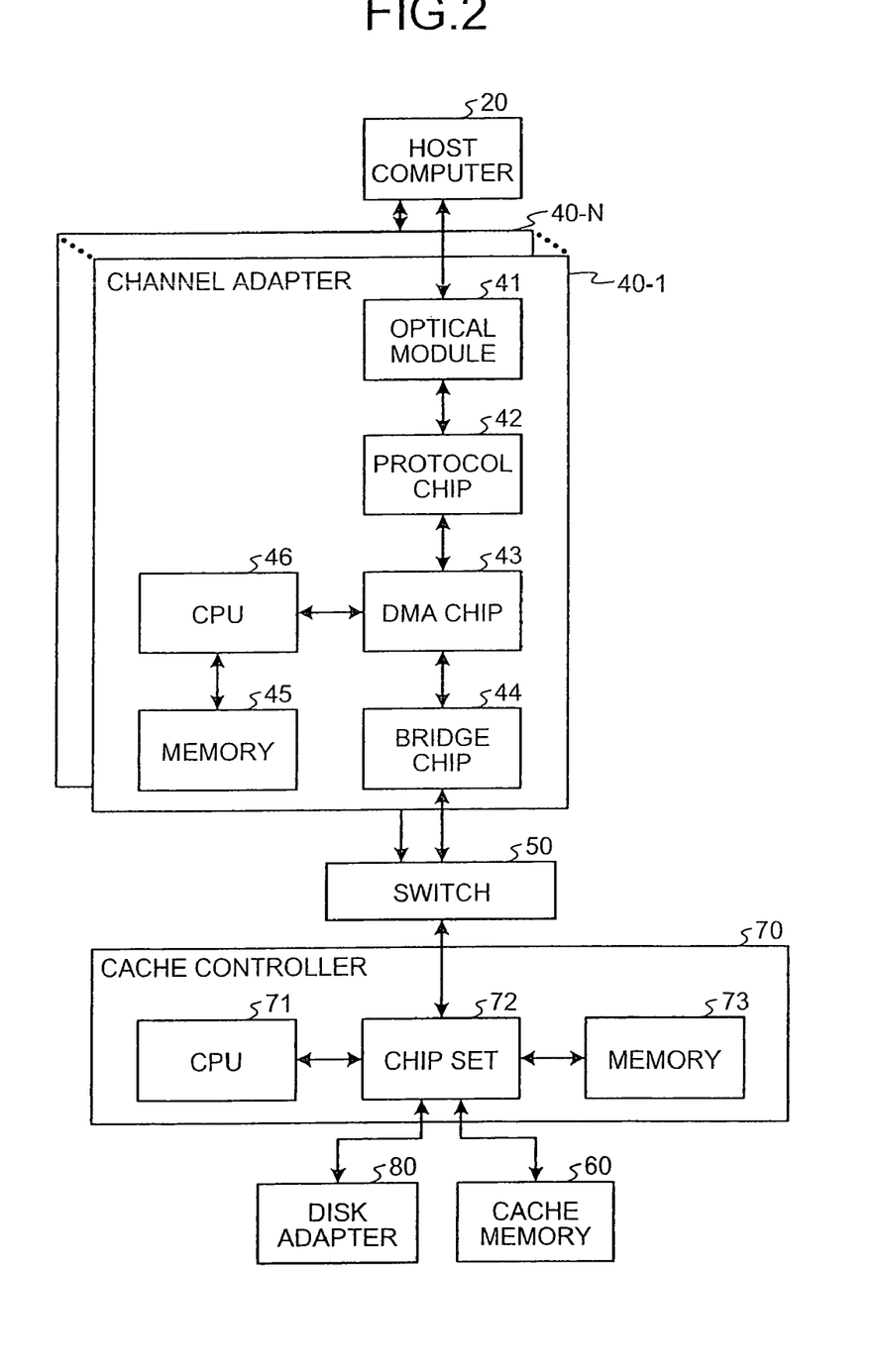
FIG. 2 is a block diagram of a relevant part of the disk array device.

FIG. 2 is a block diagram of a relevant part of the disk array device 10. Reference letters A and B in FIG. 1 are omitted in FIG. 2, for example, the host computers 20A and 20B are represented as a host computer 20. Of the components of the disk array device 10 shown in FIG. 1, FIG. 2 depicts a channel adapter 40-1, a switch 50, a cache memory 60, a cache controller 70, and a disk adapter 80. Internal structure of the channel adapter 40-1 and the cache controller 70 is also shown in FIG. 2.

The channel adapter 40-1 includes an optical module 41, a protocol chip 42, a DMA chip 43, a bridge chip 44, a memory 45, and a CPU 46.

The optical module 41 is connected to the host computer 20. The optical module 41 converts optical signals from the host computer 20 transmitted through optical fibers and the like to electric signals, and electric signals output from the protocol chip 42 to optical signals, and transmits those signals to the host computer 20.

The protocol chip 42 is large scale integration (LSI) for controlling a protocol of a fiber channel link (the fiber channel links 30A and 30B in FIG. 1) used for connecting the host computer 20 to the channel adapter 40-1. The protocol chip 42 outputs data exchanged between the channel adapter 40-1 and the host computer 20 as electric signals to the optical module 41.

The DMA chip 43 has function of an interface for communicating with the cache memory 60 connected to the cache controller 70 and function of DMA. The DMA chip 43 communicates with the cache memory 60, and transfers data by DMA in response to instructions from the CPU 46. Specifically, for example, when transferring data from the host computer 20 to the cache memory 60 by DMA, the DMA chip 43 sends a destination address of the data and the data to the switch 50 via the bridge chip 44. If an interruption process is required, the DMA chip 43 transfers the data using, for example, an MSI address corresponding to the interruption process as the destination address.

The bridge chip 44 is connected to the switch 50. When the data is transferred by the DMA chip 43, the bridge chip 44 sends the data to and receives the data from the switch 50.

The memory 45 is configured of, for example, dynamic random access memory (DRAM), and stores therein a descriptor (instructions from the CPU 46 to the DMA chip 43) generated by the CPU 46.

The CPU 46 controls the channel adapter 40-1. The CPU 46 interprets a command from the host computer 20 and issues an instruction of data transfer to the DMA chip 43.

The protocol chip 42, the DMA chip 43, and the CPU 46 are connected to each other by a peripheral component interconnect (PCI) bus, and data transfer and issuing of data transfer instructions are executed via the PCI bus.

The cache controller 70 shown in FIG. 2 includes a CPU 71, a chip set 72, and a memory 73.

The CPU 71 controls the cache controller 70. The CPU 71 instructs the chip set 72 to read data from and write data to the cache memory 60 and to transfer data to the disk adapter 80. When notified by the chip set 72 that an interrupt has occurred, the CPU 71 interrupts the current process and executes an interruption process on a priority basis. If notified of occurrence of an error, the CPU 71 refers to the error history retained in the switch 50, and forcibly shuts down one of channel adapters 40-1 to 40-N that caused the error.

The chip set 72 follows instructions from the CPU 71, and writes data output from the switch 50 to the cache memory 60 and transfers the data to the disk adapter 80. At such time, if the destination address of the data output from the switch 50 is an address corresponding to the interruption process, the chip set 72 notifies the CPU 71 that an interrupt has occurred. If the chip set 72 receives an error message from the switch 50, the chip set 72 notifies the CPU 71 that an error has occurred.

The memory 73 is configured of, for example, DRAM, and stores therein instructions generated by the CPU 71 for the chip set 72.

Figure 3:
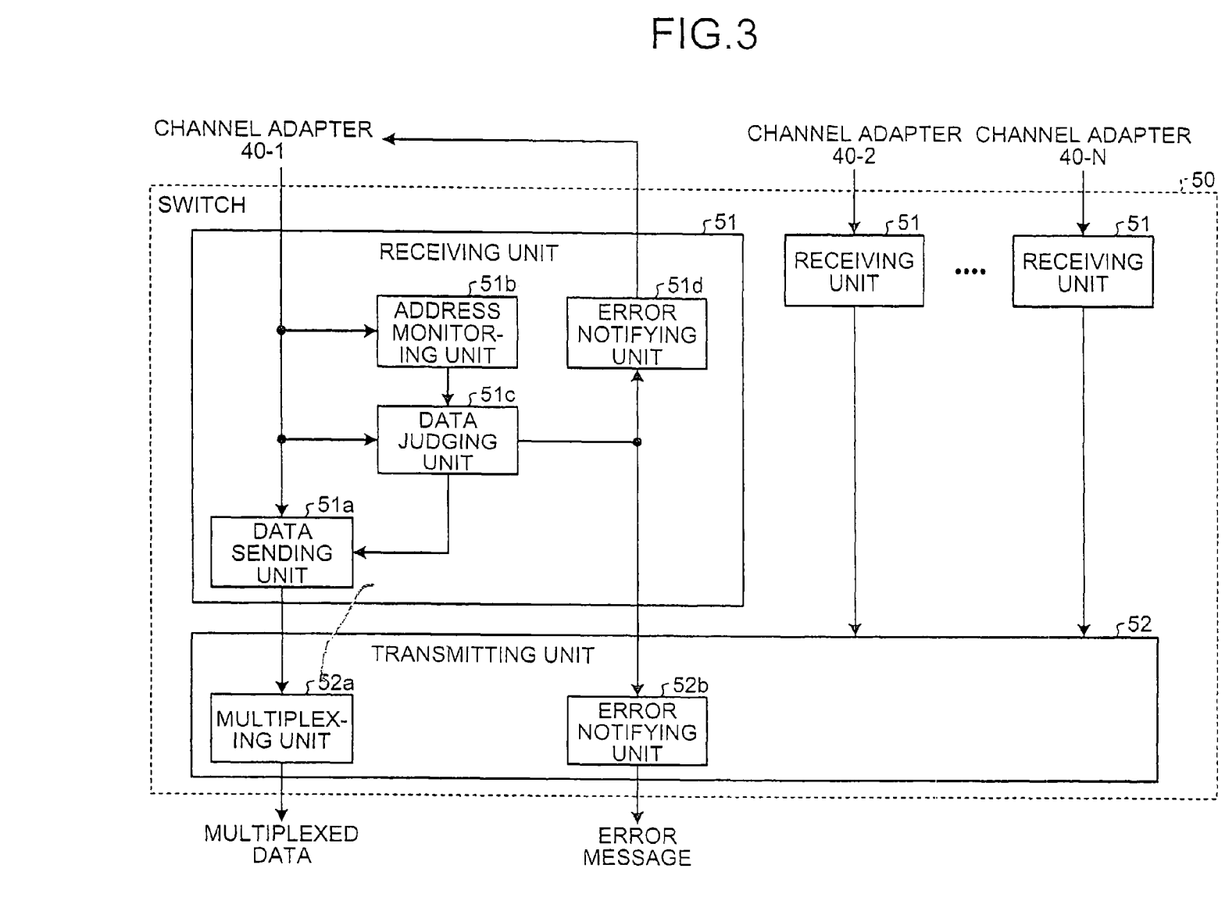
FIG. 3 is a block diagram of a switch shown in FIG. 1.

FIG. 3 is a block diagram of the switch 50. The switch 50 includes receiving units 51 that correspond to the channel adapters 40-1 to 40-N, and a transmitting unit 52 that transmits data to the cache controller 70. Each of the receiving units 51 includes a data sending unit 51a, an address monitoring unit 51b, a data judging unit 51c, and an error notifying unit 51d. In FIG. 3, only detailed structure of the receiving unit 51 corresponding to the channel adapter 40-1 is shown. The receiving units 51 corresponding to the other channel adapters 40-2 to 40-N also have the same structure.

The data sending unit 51a receives, from corresponding one of the channel adapters 40-1 to 40-N, data that is transferred by DMA and data that requests an interruption process, and sends the data to the transmitting unit 52. However, when data transmitting is interrupted by the data judging unit 51c, the data sending unit 51a does not send the data to the transmitting unit 52.

The address monitoring unit 51b monitors a destination address of the data that is received from the corresponding one of the channel adapters 40-1 to 40-N, and judges whether the destination address is an address that specifies the interruption process. If the destination address is an address that specifies the interruption process, the address monitoring unit 51b instructs the data judging unit 51c to check the data.

Figure 4:
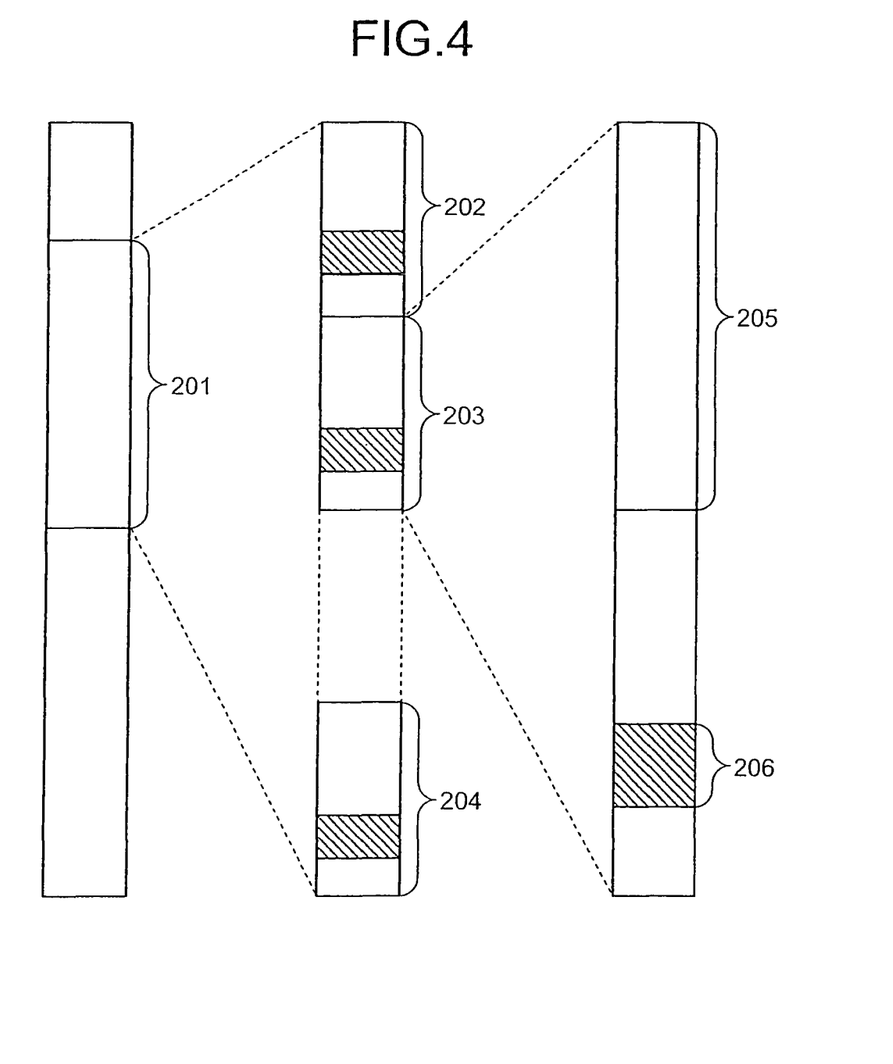
FIG. 4 is a schematic for explaining an address space according to the embodiment.

An address space related to the destination address of the data received from the channel adapters 40-1 to 40-N, for example, is as shown in FIG. 4. In other words, an address of an area 201, in the address space, is allocated to the channel adapters 40-1 to 40-N. The addresses of the area 201 are allocated among the channel adapters 40-1 to 40-N. In FIG. 4, an address of an area 202 is allocated to the channel adapter 40-1, an address of an area 203 is allocated to the channel adapter 40-2, and an address of an area 204 is allocated to the channel adapter 40-N.

An area allocated to each of the channel adapters 40-1 to 40-N include a data area 205 that specifies ordinary writing of data in the cache memory 60 and an interruption area 206 that specifies an interruption process performed, for example, by MSI and the like. When a destination address of the data received from the channel adapters 40-1 to 40-N is included in the interruption area 206, the address monitoring unit 51b instructs checking of the data. The address monitoring unit 51b instructs checking of data in addresses of interruption areas related to all the channel adapters 40-1 to 40-N. That is, for example, the address monitoring unit 51b in the receiving unit 51 corresponding to the channel adapter 40-1 instructs checking of the data in the address of the interruption area 206 in an area allocated to the channel adapter 40-1 and the addresses of the interruption areas 206 in areas allocated to the channel adapters 40-2 to 40-N as well.

The data judging unit 51c stores in advance a data pattern of the data that is to be transferred at the time of interruption process. When there is an instruction from the address monitoring unit 51b regarding checking of the data, the data judging unit 51c compares the data received from the channel adapters 40-1 to 40-N with the data pattern stored in advance, and judges whether the data is appropriate. That is, because the processes that can be called interruption process are limited, the data judging unit 51c stores data patterns of the data corresponding to all processes that are likely to be interruption processes. When the data judging unit 51c is instructed by the address monitoring unit 51b to check data, the data judging unit 51c judges whether the received data matches the data pattern stored in advance.

Figure 5:
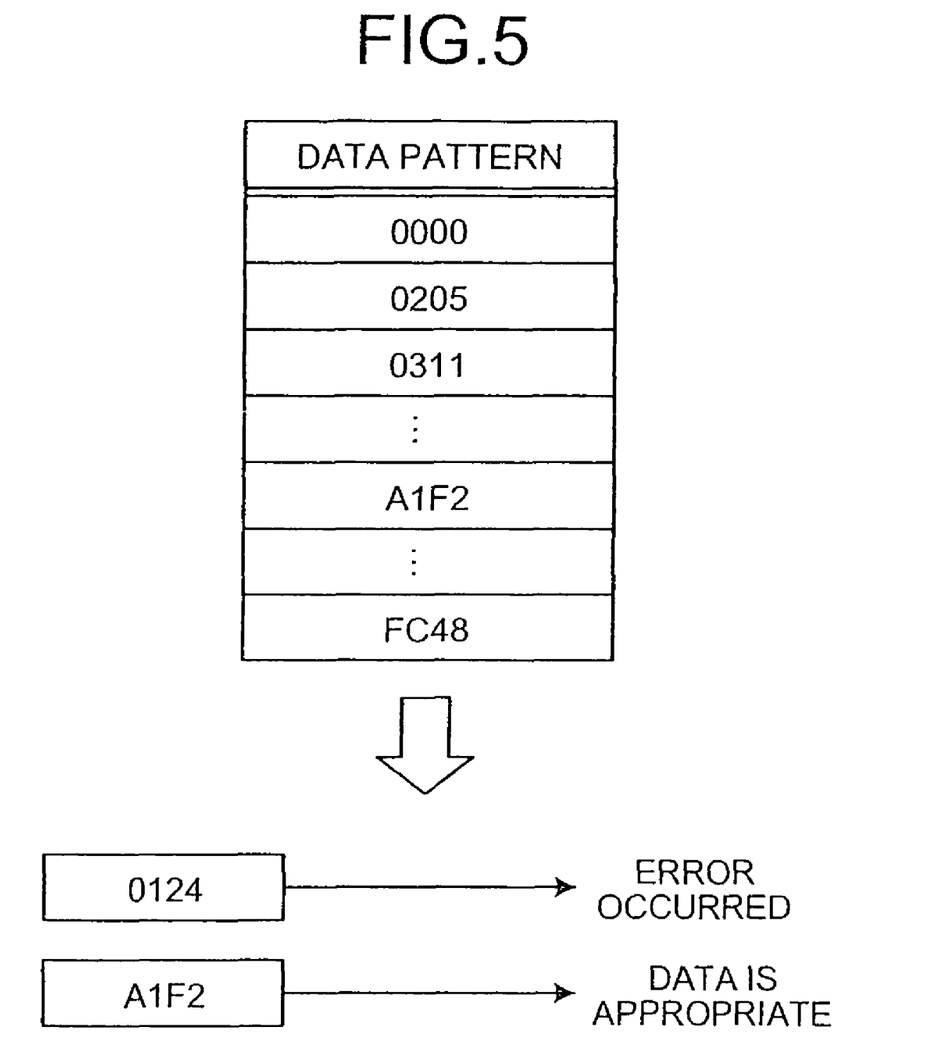
FIG. 5 is an example for explaining checking of data.

FIG. 5 is an example for explaining how to check data. Specifically, for example, as shown in FIG. 5, when the data pattern is stored in advance in the data judging unit 51c, and the data judging unit 51c is instructed by the address monitoring unit 51b to check data, the data judging unit 51c checks data "0124" input by one of the channel adapters 40-1 to 40-N. The data judging unit 51c judges that an error has occurred because the data "0124" does not match any one of data included in the data pattern. On the other hand, if the data input by one of the channel adapters 40-1 to 40-N is "A1F2", the data judging unit 51c judges that the data "A1F2" is appropriate because the data "A1F2" is included in the data pattern.

When an error occurs, the data judging unit 51c notifies occurrence of the error to the error notifying unit 51d and an error notifying unit 52b of the transmitting unit 52, and interrupts sending of data from the data sending unit 51a.

When the error notifying unit 51d is notified by the data judging unit 51c that the error has occurred, the error notifying unit 51d notifies about the error by transmitting an error message to corresponding one of the channel adapters 40-1 to 40-N. The channel adapter that is notified of the error by the error notifying unit 51d, if possible, saves data in the memory 45 and the like, and shuts down voluntarily.

The transmitting unit 52 includes a multiplexing unit 52a and the error notifying unit 52b. The multiplexing unit 52a multiplexes data that is sent from the data sending unit 51a in each receiving unit 51, and transfers the data to the cache controller 70 as one output. The multiplexing unit 52a can select any one of data that are sent from the data sending unit 51a and transfer the data to the cache controller 70.

When the error notifying unit 52b is notified of occurrence of an error by the data judging unit 51c, the error notifying unit 52b notifies the cache controller 70 of the error by sending an error message to the cache controller 70. When the cache controller 70 is notified of the error by the error notifying unit 52b, the CPU 71 in the cache controller 70 refers to the error history stored in a register and the like (not shown) in the switch 50, and specifies a channel adapter from the channel adapters 40-1 to 40-N where the error has occurred. If the channel adapter from the channel adapters 40-1 to 40-N where the error has occurred does not shut down voluntarily, the CPU 71 shuts it down forcibly.

Figure 6:
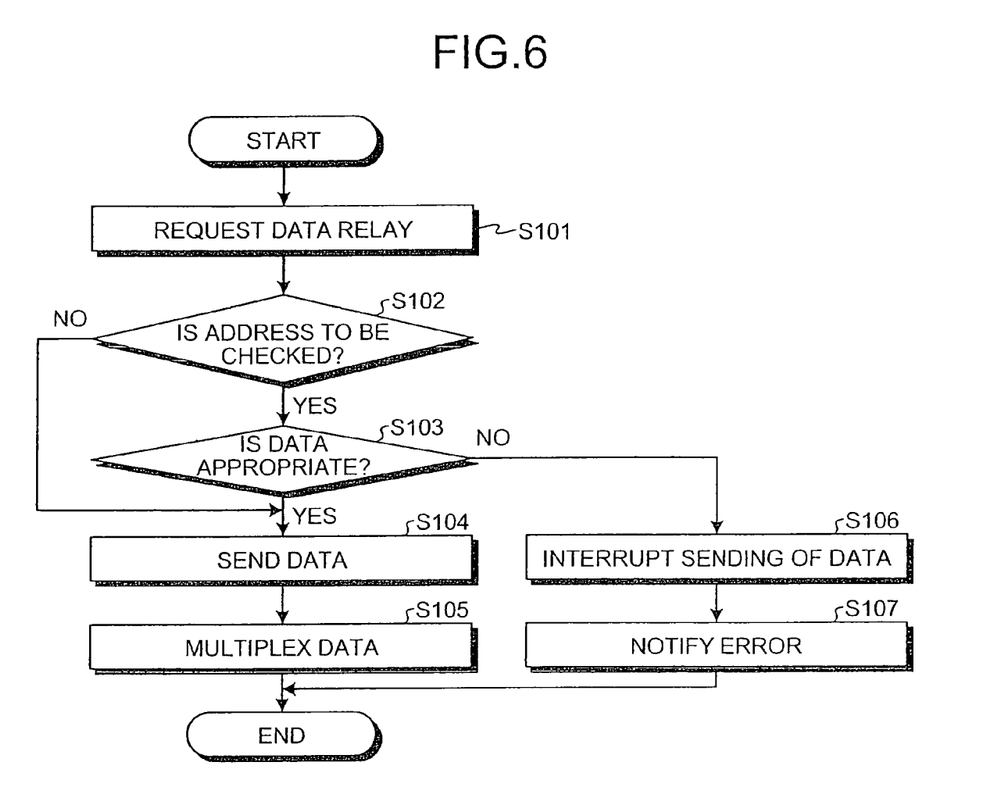
FIG. 6 is a flowchart of a data-relay method according to the embodiment.

FIG. 6 is a flowchart of a data-relay method according to the embodiment. The data-relay method used by the switch 50 is explained referring to FIG. 6. An example in which data is transferred from the channel adapter 40-1 is explained below.

When data is to be transferred by the CPU 46 and the DMA chip 43 in the channel adapter 40-1, the data is input from the bridge chip 44 of the channel adapter 40-1 to the switch 50, and the cache controller 70 is requested to relay the data (step S101). Examples of the data to be transferred include data that is to be written to the cache memory 60 and data that requests the interruption process. The data input in the switch 50 is input in the receiving unit 51 corresponding to the channel adapter 40-1, and the address monitoring unit 51b judges whether the destination address of the data is included in the interruption area. In other words, the address monitoring unit 51b judges whether the destination address of the data is to be checked (step S102).

The address monitoring unit 51b retains in advance addresses of interruption areas of the channel adapter 40-1 and the channel adapters 40-2 to 40-N. Therefore, even if the destination address of the data input by the channel adapter 40-1 is the address of an interruption area of one of the channel adapters 40-2 to 40-N, it is judged that the data input by the channel adapter 40-1 is to be checked. Thus, even if the destination address of the data input by the channel adapter 40-1 is, for example, the address of the interruption area of the channel adapter 40-2, the data is checked. Thus, data whose destination address specifies the interruption process is checked without fail.

As a result of the judgment by the address monitoring unit 51b, if the destination address is not to be checked (No at step S102), the data is sent, as it is, from the data sending unit 51a to the transmitting unit 52 (step S104), because the data transferred from the channel adapter 40-1 is data that is to be written to the cache memory 60. The data is multiplexed by the multiplexing unit 52a in the transmitting unit 52 with data that is sent from the other receiving unit 51 (step S105), and is sent to the chip set 72 in the cache controller 70 as a single output of multiplexed data. The chip set 72 that receives the multiplexed data referrers to the destination address of the data, and writes the data to the cache memory 60.

If the destination address of the data input by the channel adapter 40-1 is to be checked (Yes at step S102), the data is treated as data that requests the interruption process. Therefore, the address monitoring unit 51b instructs the data judging unit 51c to check the data, and the data judging unit 51c judges whether the data is appropriate (step S103). Specifically, the data judging unit 51c judges whether the data input from the channel adapter 40-1 matches any data included in the data pattern stored in advance as data corresponding to the interruption process If the data pattern includes data that matches the data input from the channel adapter 40-1, it is judged that the data is appropriate (Yes at step S103). The data, which requests the interruption process, is sent from the data judging unit 51c to the transmitting unit 52 (step S104). The data is multiplexed with the data sent from the receiving unit 51 in the multiplexing unit 52a in the transmitting unit 52, and is transmitted as one output of multiplexed data to the chip set 72 in the cache controller 70. The chip set 72 refers to the destination address of the multiplexed data and detects occurrence of the interruption process. The chip set 72 notifies occurrence of the interruption process to the CPU 71.

If the data pattern stored in advance in the data judging unit 51c does not include data that matches the data input from the channel adapter 40-1, it is judged that the data is inappropriate (No at step S103), and the data judging unit 51c interrupts sending of the data from the data sending unit 51a (step S106). As a result, even though the destination address specifies the interruption process, if the data is not defined as data for the interruption process, the data is not relayed to the cache controller 70, and it is possible to prevent shut down of the CPU 71 due to an unexpected interruption process.

When sending of the data is interrupted by the data judging unit 51c, the error notifying unit 51d and the error notifying unit 52b in the transmitting unit 52 are notified about the occurrence of the error. The error notifying unit 51d sends an error message to the channel adapter 40-1, and the error notifying unit 52b sends an error message to the cache controller 70 to notify the error (step S107). Furthermore, the data judging unit 51c stores the error history about occurrence of the error in the register (not shown) in the switch 50.

Figure 7A:
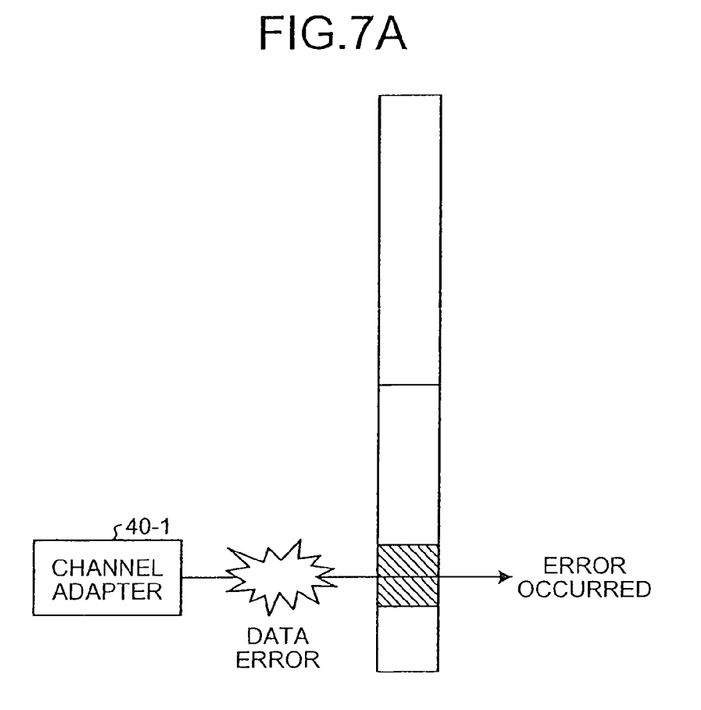
FIGS. 7A and 7B are examples of occurrence of an error according to the embodiment.

There are two categories of errors detected by the data judging unit 51c. As shown in FIG. 7A, a first category includes an error occurring in data which specifies the interruption process while the data is being transferred from the channel adapter 40-1 to the switch 50. However, any error does not occur in the destination address included in an interruption area indicated by slanting lines in FIG. 7A. In such case, because the destination address is included in the interruption area, the data is checked by the data judging unit 51c. However, because the error has occurred in the data, data input from the channel adapter 40-1 does not match the data pattern that includes the data stored in the data judging unit 51c. Thus, it is judged that the error has occurred.

Figure 7B:
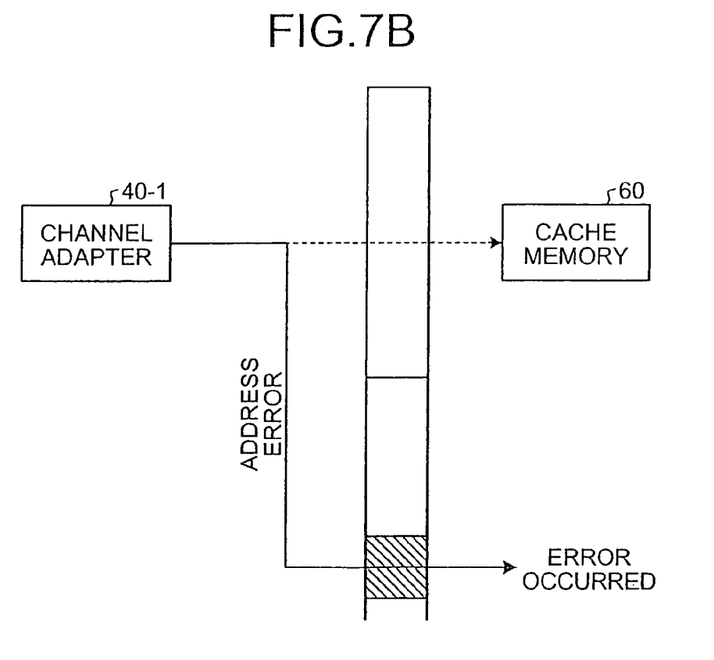

A second category of the error detected by the data judging unit 51c includes an error occurring in the destination address included in an interrupt area indicated by slanting lines in FIG. 7B, while the data is being transferred from the channel adapter 40-1 to the switch 50, as shown in FIG. 7B, and not in the data. Under ordinary circumstances, the data is to be written to the cache memory 60 and checked by the data judging unit 51c. When the data is checked by the data judging unit 51c in this case, input from the channel adapter 40-1 does not match the data pattern that includes the data stored in the data judging unit 51c, and it is judged that the error has occurred.

Any one of errors in the categories are detected through the check conducted by the data judging unit 51c, and the error is notified to the channel adapter 40-1, where the error has occurred, and the cache controller 70. The channel adapter 40-1, which is notified about the error, shuts down voluntarily. The cache controller 70, which is notified about the error, notifies occurrence of the error to the CPU 71 through the chip set 72. The CPU 71 reads the error history stored in the register (not shown) in the switch 50. The error history retains information that the error has occurred in the channel adapter 40-1. Therefore, the CPU 71 does not refer to condition of the other devices, and is able to specify the cause of the error with ease.

When the channel adapter 40-1 is specified by the CPU 71 where the error has occurred, the CPU 71 disconnects the channel adapter 40-1 through a dedicated line that connects each of the channel adapters 40-1 to 40-N. Thus, the channel adapter 40-1 is reliably shut down, and processes thereafter can be performed by the other channel adapters.

According to the embodiment, when the destination address of data that is to be transferred from the channel adapter is an address corresponding to the interruption process, the switch, which relays the data from the channel adapter to the cache memory, judges whether the data specifies the defined interruption process. If the data is inappropriate, relaying of the data is suspended. At the same time, the switch notifies occurrence of an error to the channel adapter, which has sent the data, and to the cache controller. Thus, the CPU in the cache controller is not required to perform the undefined interruption process, and it is possible to prevent shut down of the CPU in the cache controller that controls writing of data from the channel adapters to the cache memory. Furthermore, the CPU in the cache controller, which notifies an error, refers to the error history retained in the switch, and is able to easily specify the channel adapter where the error has occurred. Thus, it is possible to reduce the processing load on the CPU.

Incidentally, in the embodiment described above, the switch 50 is set separately from the cache controller 70. However, the switch 50 can be provided integrally with the cache controller 70, and the cache controller 70 also has the same function as the switch 50. The CPU inside the channel adapters 40-1 to 40-N and the cache controller 70 can be replaced by, for example, microprocessor unit (MPU).

According to an aspect of the present invention, it is possible to prevent a request for inappropriate interrupt to a processor in a controller, and at the same time, it is possible for a data relay device to specify an adapter that has sent inappropriate data. As a result, it is possible to prevent shut down of the processor that controls writing of data from a plurality of channel adapters to a cache memory. It is also possible for the processor to easily specify the channel adapter that causes an error by referring to error history in the data relay device, whereby processing load on the processor is reduced.

According to another aspect of the present invention, data corresponding to process, which is defined as the interruption process, is judged as an appropriate data. Thus, it is possible to prevent request of undefined interrupt to the processor According to still another aspect of the present invention, voluntary shut down of the channel adapter is possible while the internal condition of the channel adapter is retained.

According to still another aspect of the present invention, the processor identifies a channel adapter, which caused an error, from the error history retained in the data relay device, and is able to shut down the channel adapter forcibly.

According to still another aspect of the present invention, regardless of the channel adapter that has sent the data, if the destination address is an address of the interrupt area, the data is reliably checked. For example, even if an error occurs in the destination address and the destination address becomes the address of the interrupt area allocated to another channel adapter, it is possible to prevent generation of an inappropriate interruption process in the processor.

According to still another aspect of the present invention, data can be transferred as one output via, for example, a bus such as PCI bus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data relay device that relays data from a plurality of adapters to a controller including a processor, the data relay device comprising:
    a monitoring unit that monitors a destination address of data received from an adapter among the adapters;
    a judging unit that judges whether the data is appropriate when the destination address matches with an address that corresponds to an interruption process to be performed by the processor;
    a transmitting unit that transmits the data to the controller only when the data is judged appropriate by the judging unit;
    a first notifying unit that notifies the adapter transmitting the data that the data is inappropriate to cause the adapter to shut down voluntarily when the data is not judged appropriate by the judging unit; and
    a second notifying unit that notifies the controller that the data is inappropriate to cause the controller to shut the adapter down forcibly when the data is not judged appropriate by the judging unit and the adapter has not shut down voluntarily.

2. The data relay device according to claim 1, wherein the judging unit judges that the data is appropriate when a data pattern corresponding to a predetermined interruption process includes data that matches the data received from the adapter.

3. The data relay device according to claim 1, wherein the judging unit suspends transmission of the data by the transmitting unit when the data is judged inappropriate by the judging unit.

4. The data relay device according to claim 1, further comprising a storing unit that stores an error history indicating that an error has occurred in the adapter transmitting the data when the data is not judged appropriate by the judging unit, wherein
    the second notifying unit causes the controller to refer to the error history stored in the storing unit and to specify the adapter to be shut down forcibly.

5. The data relay device according to claim 1, wherein the monitoring unit monitors whether the destination address of the data received from the adapter is included in any one of address areas that specify interruption processes allocated to the respective adapters.

6. The data relay device according to claim 1, wherein the transmitting unit includes a multiplexing unit that multiplexes the data received from the adapters.

7. A storage device that stores data transmitted from a host computer by writing the data to a storage medium, the storage device comprising:
    a channel adapter that receives the data from the host computer;
    a switch that relays the data received by the channel adapter; and
    a cache controller that includes a processor and controls writing of the data to a cache memory, wherein the switch includes
        a monitoring unit that monitors destination address of the data received by the channel adapter;
        a judging unit that judges whether the data is appropriate when the destination address matches with an address that corresponds to an interruption process to be performed by the processor;
        a transmitting unit that transmits the data to the cache controller only when the data is judged appropriate by the judging unit
        a first notifying unit that notifies the channel adapter that the data is inappropriate to cause the channel adapter to shut down voluntarily when the data is not judged appropriate by the judging unit; and
        a second notifying unit that notifies the cache controller that the data is inappropriate to cause the cache controller to shut the channel adapter down forcibly when the data is not judged appropriate by the judging unit and the channel adapter has not shut down voluntarily.

8. A method of relaying data from a plurality of adapters to a controller including a processor, the method comprising:

monitoring a destination address of data received from an adapter among the adapters;

judging whether the data is appropriate when the destination address matches with an address that corresponds to an interruption process to be performed by the processor;

transmitting the data to the controller only when the data is judged appropriate at the judging notifying the adapter transmitting the data that the data is inappropriate to cause the adapter to shut down voluntarily when the data is not judged appropriate at the judging; and notifying the controller that the data is inappropriate to cause the controller to shut the adapter down forcibly when the data is not judged appropriate at the judging and the adapter has not shut down voluntarily.

9. The method according to claim 8, wherein the judging includes judging that the data is appropriate when a data pattern corresponding to a predetermined interruption process includes data that matches the data received from the adapter.

10. The method according to claim 8, wherein the judging includes judging suspending transmission of the data to the controller when the data is judged inappropriate at the judging.

11. The method according to claim 8, wherein the monitoring includes monitoring whether the destination address of the data received from the adapter is included in any one of address areas that specify interruption processes allocated to the respective adapters.

12. The method according to claim 8, wherein the transmitting includes multiplexing the data received from the adapters before transmitting the data to the controller.

* * * * *